United States Patent [19]

Caron et al.

[11] Patent Number: 4,759,600
[45] Date of Patent: Jul. 26, 1988

[54] HOLDER FOR FIBER OPTIC CONNECTORS

[75] Inventors: Bernard G. Caron; John C. Hoffer, both of Harrisburg, Pa.

[73] Assignee: AMP Incorporated, Harrisburg, Pa.

[21] Appl. No.: 734,505

[22] Filed: May 15, 1985

[51] Int. Cl.⁴ .................................................. G02B 6/38
[52] U.S. Cl. ................................................... 350/96.21
[58] Field of Search ................ 350/96.20, 96.21, 96.22

[56] References Cited

U.S. PATENT DOCUMENTS

| | | | |
|---|---|---|---|
| 4,311,359 | 1/1982 | Keller | 350/96.20 |
| 4,588,257 | 5/1986 | Maranto | 350/96.21 |
| 4,666,241 | 5/1987 | Caron | 350/96.21 |
| 4,693,550 | 9/1987 | Brown et al. | 350/96.20 |

FOREIGN PATENT DOCUMENTS 0105597 4/1984 European Pat. Off. .
0128044 12/1984 European Pat. Off. .

*Primary Examiner*—William L. Sikes
*Assistant Examiner*—Robert E. Wise
*Attorney, Agent, or Firm*—Gerald K. Kita

[57] ABSTRACT

An improved holder 1 for a fiber optic connector assembly 24 comprises a platform 5 for engaging a surface 3 of a panel 4, spaced apart tines 21, 21 for holding respective fiber optic connectors 25, 25 removably inserted into a sleeve body 27, a pair of non-bifurcated legs 6, 7 for insertion or withdrawal along corresponding apertures 10, 11, each leg 6, 7 extending at an oblique angle with respect to the axis of the corresponding aperture, each leg 6, 7 being concave curved along its width, the tines 21, 21 include notches 30, 30 to adjust the resiliency of the tines 21, 21, retaining means 23, 23 for resisting removal of the connectors, and the platform 5 includes retaining means 30, 30 for resisting movement of the sleeve body.

3 Claims, 2 Drawing Sheets

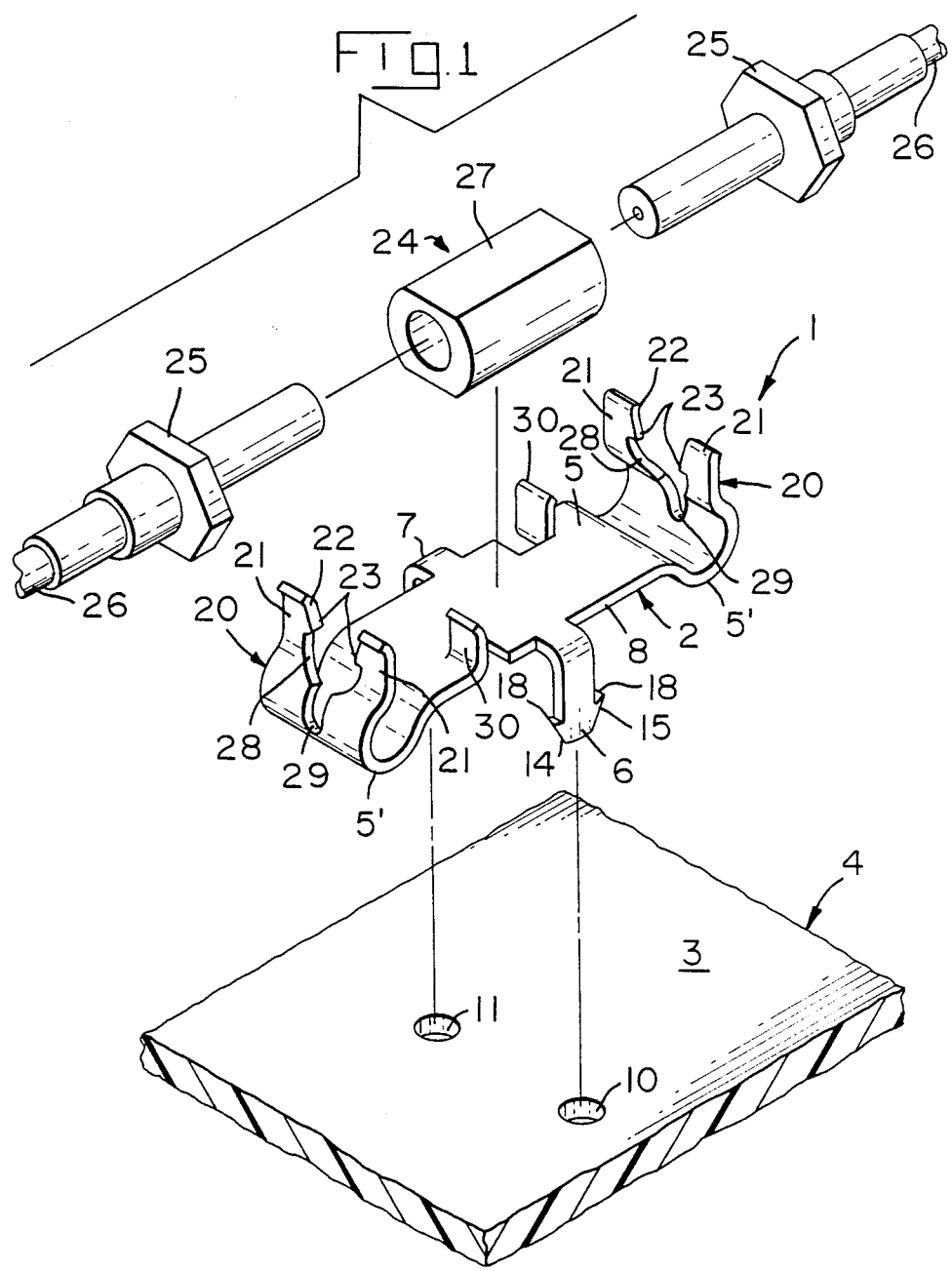

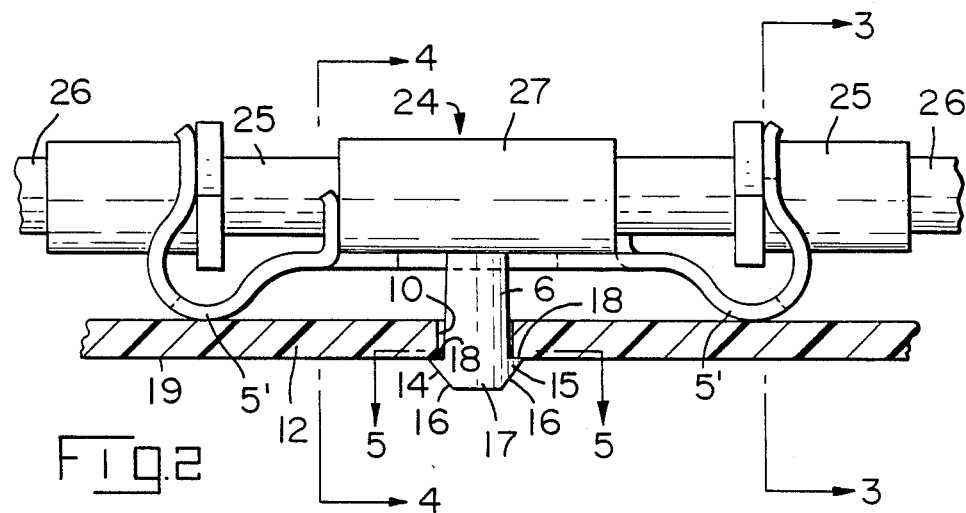

HOLDER FOR FIBER OPTIC CONNECTORS

The invention relates to connectors for optical fibers and particularly relates to a holder for removably mounting an assembly of two connectors for optical fibers and a sleeve body that conforms the connectors into axial alignment. The holder is constructed for removably mounting the assembly to a panel, and further for ease in relocation of the holder to select locations on the panel.

A known holder is disclosed in European Patent Application Publication No. 83304960.4, Sept. 16, 1983, and European Patent Application Publication No. 0128044, Dec. 12, 1984. The known holder is formed from metal having resilient spring characteristics. The known holder includes a base portion with integral and bifurcated legs projecting from the base portion and extending along apertures projecting through the thickness of a panel against which the holder is mounted. Inclined projections on the legs include shoulders for engagement against the panel to resist withdrawal of the legs from the apertures. The legs are deflected resiliently to disengage the shoulders from the panel and permit passage of the shoulders along the apertures during withdrawal of the legs from the apertures. Once the legs are withdrawn, the holder is duly ready for relocation and assembly on the panel.

Several disadvantages are associated with the process of withdrawing the bifurcated legs from corresponding apertures. One such disadvantage resides in the bifurcated portions of each leg. The bifurcated portions must be deflected simultaneously to enable their insertion or withdrawal from an aperture, and tend to interfere with each other during their deflection and passage along the aperture. Further it is difficult to manipulate and maneuver simultaneously both bifurcated portions of each leg for passage of both portions through a corresponding aperture. A further disadvantage is that the bifurcated legs sometimes become damaged during their removal from the apertures. The legs are weakened by their bifurcated form. Thereby the legs tend to become permanently distorted from the stresses associated with their removal and withdrawal from the panel.

The known holder further includes spaced apart spring fingers that hold the correspond connectors and sleeve body on the holder. The fingers apply force axially on corresponding connectors to urge the connectors inwardly of the sleeve body. The spring fingers lack means for resisting removal of the sleeve body and corresponding connectors. Consequently the sleeve body and the connectors can be dislodged from the holder, particularly if the holder is subject to vibration.

The fingers are required to undergo resilient deflection when engaged by the connectors during insertion or withdrawal of the connectors. The fingers lack means for adjusting their resiliency. Consequently, the fingers of corresponding holders either are too stiff and unduly resist insertion of the connectors, or are too weak and become permanently deformed upon their deflection by the connectors.

An improved holder according to the invention is provided with non-non-bifurcated legs that resist permanent distortion, and further are spring resilient to restore to their original shape after they have experienced deflection and withdrawal from corresponding apertures of a panel.

Each leg of the improved holder is concave to increase their strength and to resist permanent distortion under stress. Each leg extends oblique to the axis of the aperture in which the leg is received, such that the concave edges of the leg engage the periphery of the aperture and inclined projections on the leg edges include corresponding shoulders that engage against the panel and resist withdrawal of the leg from the aperture. The width of the leg is less than the diameter of the aperture to permit passage of the leg along the axis of the aperture. Each leg is capable of resilient deflection into suitable alignment with the aperture to permit withdrawal of the leg along the aperture.

Another improvement of the invention resides in retaining means for resisting movement of the two connectors and the sleeve body. The retaining means are in the form of barbs struck from the thickness of the base for registration against opposite ends of a sleeve body supported on the base. Further projecting means are in the form of additional barbs integral with the supporting fingers to resist undesired removal of the connectors from the fingers.

An object of the invention is to provide an improved holder for fiber optic connectors in which projecting means on the holder resist movement of a sleeve body which conforms the connectors into axial alignment.

Another object of the invention is to provide an improved holder for fiber optic connectors to which the holder is provided with non-bifurcated legs each concave toward a corresponding periphery of an aperture and extending oblique to the axis of the aperture for registration of edges of the leg against the aperture periphery.

Another object of the invention is to provide an improved holder for fiber optic connectors in which the holder is provided with means for resisting undesired movement and undesired removal of the connectors from the holder.

Other objects and advantages of the invention are apparent from the following description, drawings and claims.

FIG. 1 is a perspective view of an improved holder according to the invention together with fiber optic connectors and a sleeve body illustrated in exploded configuration.

FIG. 2 is an elevation view of the holder and the connectors and the sleeve body assembled together.

FIG. 3 is a section view taken along the line 3—3 of FIG. 2.

FIG. 4 is a section view taken along the line 4—4 of FIG. 2.

FIG. 5 is a section view taken along the line 5—5 of FIG. 2.

FIG. 6 is a section view similar, to FIG. 4, illustrating a holder in a pivoted position.

Reference is made to FIGS. 1 and 4 of the drawings in which is shown a holder 1 of the invention fabricated by stamping and forming a blank of resilient spring metal. The holder 1 includes a base 2 for mounting on a surface 3 of a panel 4. The base 2 includes a central platform 5 with curved ends 5', 5' projecting toward the surface 3, and a pair of non-bifurcated legs 6, 7 extending from opposite sides 8, 9 of the platform 5. Each leg 6, 7 is bent to project along its length outwardly from the platform 5 and in the same direction as the curved ends 5' 5', thereby to extend for reception in corresponding apertures 10, 11 extending through the thickness 12 of the panel 4.

As shown in FIGS. 4 and 5, the plane of each leg 6, 7 is curved along the width of the corresponding leg to provide a concave surface 13 facing the other leg. A projection 14, 15 extends from a respective longitudinal edge of each leg 6, 7. Each projection 14, 15 is tapered at 16 to provide a tapered free end 17 of a corresponding leg 6, 7 that promotes registration of the leg in a respective aperture 10, 11. A shoulder 18, 18 on each projection 14, 15 projects outwardly of the respective longitudinal edge of a corresponding leg 6, 7 for engaging a surface 19 of the panel 4 opposite the surface 3 on which the base 2 engages. Each leg 6, 7 extends at an oblique angle toward the other leg and to the axis 10′ of the corresponding aperture 10, 11 in which the leg is received. The width of the leg as measured from one projection 14, 15 to the other is less than the diameter of the corresponding aperture 10, 11, thereby to permit passage of the leg 6, 7 in and along the aperture. Each leg 6, 7 is spring resilient and capable of resilient deflection from its oblique alignment into alignment with the diameter of the corresponding aperture 10, 11 suitably to permit passage of the leg along the aperture, either during insertion or withdrawal of the leg.

During insertion, both legs 6, 7 of a corresponding holder 1 are aligned with corresponding apertures 10, 11. Then pressure is applied on the holder 1 to cause movement of the legs 6, 7 along the apertures 10, 11. The peripheries of the apertures 10, 11 engage and resiliently deflect the legs 6, 7 into suitable alignment with the apertures to enable passage of the legs along the apertures. The curved ends 5′, 5′ of the platform 5 will resiliently deflect to adjust the distance of the platform 5 from the panel 4, and to permit extension of the legs 6, 7 along the apertures 10, 11 until the projections 18, 18 emerge from the opposite surface 18 of the panel 4. When the projections 18, 18 on each leg 6, 7 emerge from an opposite surface 18 of the panel, the spring resiliency in each leg tends to restore the leg to its position oblique to the axis 10′ of the corresponding aperture 10, 11 in which the leg is received, such that the concave surface 13 assumes a position offset from the axis of the aperture and toward the aperture periphery, and the longitudinal edges of the leg engage the periphery, as shown in FIG. 5. To resist undesired withdrawal of the legs 6, 7 from the apertures 10, 11, the corresponding shoulders 18, 18 engage the opposite side 19 of the panel.

During withdrawal, at least one leg 6, 7 of the holder 1 is deflected resiliently and is disengaged from the periphery of a corresponding aperture 10, 11 and into suitable alignment with the corresponding aperture to permit withdrawal of the leg. The holder 1 will pivot about the other leg 6, 7 remaining in the corresponding aperture 10, 11 until the deflected leg is fully withdrawn from the associated aperture, as shown in FIG. 6. Thereafter, the other leg is enabled for withdrawal from the corresponding aperture without a requirement to deflect the other leg. Thus removal of the holder 1 from the panel 4 is easily accomplished without a need for deflection of both legs 6, 7.

As shown in FIGS. 1, 2 and 4, the platform 5 of the base 2 is provided with barbs 20 struck out from the metal blank and projecting outwardly of the surface of the platform. Opposite ends of the base 2 have spring resilient fingers 20, 20 integral with the convex curved portions 5′, 5′ of the base 2. Each finger 20, 20 is bifurcated into a pair of spring resilient tines 21, 21 separated by a connector receiving space 22, 22 which has an open end between the free ends of the tines 21, 21. Retaining means in the form of barbs 23, 23 are integral with corresponding tines 21, 21 and project into the corresponding space 22, 22 between the tines.

FIGS. 1 and 2 show a fiber optic connector assembly 24 comprising a pair of plug connectors 25, 25 for an optical fiber 26, 26 and a sleeve body 27. Each connector 25, 25 surrounds an optical fiber 26, 26 and positions an end of the optical fiber concentrically along the axis of an end of a corresponding connector. The sleeve body 27 removably receives the connectors 25, 25 in opposite ends of the sleeve body and conforms the ends of the connectors into axial alignment. Thereby the optical fibers 26, 26 are axially aligned and optically coupled with minimum optical signal loss.

The holder 1 serves to mount the assembly 24 to the panel 2. The assembly 24 is aligned with the holder 1 such that the connectors 25, 25 are opposite corresponding open ends of the spaces 22, 22 between the tines 21, 21 and the sleeve body 27 is positioned opposite the platform 5. Force is applied to the assembly 24 to insert the connectors 25, 25 into corresponding spaces 22, 22 and to engage the sleeve body 27 against the platform 5. Each connector 25, 25 enters a corresponding space 22, 22 and resiliently deflects the tines 21, 21 of a common finger 20, 20 apart from each other. The connectors 25, 25 engage and rest against the respective bottoms 28, 28 of the spaces 22, 22, and more specifically on the metal portions of the fingers 20, 20 that define the bottoms of the spaces. Once each connector 25, 25 moves along the space 22, 22 and past the barbs 23, 23, the tines 21, 21 tend to move by resilient spring action to move the barbs 23, 23 toward each other and restrict the width of the space. The barbs 23, 23 thereby resist undesired removal of the connector 25, 25 from the corresponding space 22, 22. To remove the connector 25, 25, sufficient force must be applied by the connector against the barbs 23, 23 to deflect the tines 21, 21 apart sufficiently to permit passage of the connector 25, 25 between the barbs 23, 23.

The holder 1 is further provided with adjustment means 29 for adjusting the spring resiliency of the tines 21, 21. The adjustment means 29, in the form of an elongated notch, is in the curved ends 5′, 5′ and communicates with the bottom 29, 29 of a corresponding space 22, 22. Each notch 29, 29 has a width less than that of a corresponding space 22, 22 and is aligned axially with the corresponding space. The lengths of the tines 21, 21 are extended by the respective notches 29, 29 to extend beyond the bottoms 29, 29, and to extend the pivot fulcrums of the tines 21, 21 further from the barbs 23, 23. Thereby, the extended lengths of the tines 21, 21 are more easily deflected apart by passage of the respective connectors 25, 25 between the tines.

The platform 5 includes retaining means in the form of tabs 30, 30 struck from the thickness of the platform 5 and projecting from the platform 5 for engagement with opposite ends of the sleeve body 27 to restrict its axial movement.

What is claimed is:

1. An improved holder formed from a blank of resilient spring metal for removably mounting a fiber optic connector assembly on a surface of a panel and comprising:

a platform for engaging the surface of the panel,
spaced apart fingers integral with the platform and projecting outwardly from the platform in a first direction away from the panel for holding corresponding fiber optic connectors removably inserted into a sleeve body that conforms the connectors into axial alignment within the sleeve body, and a pair of non-bifurcated legs integral with the platform and projecting from the platform in a second direction toward the panel for insertion and withdrawal along corresponding apertures through the thickness of the panel, each leg extending at an oblique angle with respect to the axis of the corresponding aperture, each leg being concave curved along its width and each leg having longitudinal edges, said width extending between said longitudinal edges.

2. The improved holder as recited in claim 1, wherein, projections are on the longitudinal edges of the legs to engage against a surface of the circuit board, and the longitudinal edges of each leg are projected by said width toward and in engagement with the periphery of the aperture in which the leg is inserted.

3. The improved holder is recited in claim 1, wherein, each finger is bifurcated by a space which receives a corresponding connector, and the fingers include retention means projecting into the corresponding spaces for overlapping the connectors and resisting movement of the two connectors and the sleeve body.

* * * * *